US012657014B2

(12) United States Patent
Lee et al.

(10) Patent No.: US 12,657,014 B2
(45) Date of Patent: Jun. 16, 2026

(54) METHOD AND SYSTEM FOR DETERMINING OPTIMIZATION APPLICABILITY ON INTERMEDIATE REPRESENTATION FROM PROGRAM

(71) Applicants: MOREH CORP., Seoul (KR); Seoul National University R&DB Foundation, Seoul (KR)

(72) Inventors: Jaejin Lee, Seoul (KR); Jungho Park, Seoul (KR); Gangwon Jo, Seoul (KR); Heehoon Kim, Daejeon (KR); Jinpyo Kim, Seoul (KR)

(73) Assignees: MOREH CORP., Seoul (KR); Seoul National University R&DB Foundation, Seoul (KR)

( * ) Notice: Subject to any disclaimer, the term of this patent is extended or adjusted under 35 U.S.C. 154(b) by 215 days.

(21) Appl. No.: 18/542,544

(22) Filed: Dec. 15, 2023

(65) Prior Publication Data

US 2024/0118878 A1 Apr. 11, 2024

Related U.S. Application Data

(63) Continuation of application No. PCT/KR2022/008506, filed on Jun. 15, 2022.

(30) Foreign Application Priority Data

Jun. 16, 2021 (KR) ........................ 10-2021-0077964
Jun. 15, 2022 (KR) ........................ 10-2022-0072638

(51) Int. Cl.
G06F 8/41 (2018.01)
G06N 3/042 (2023.01)
(52) U.S. Cl.
CPC ............. G06F 8/443 (2013.01); G06N 3/042 (2023.01)

(58) Field of Classification Search
CPC ................................ G06F 8/443; G06N 3/042
(Continued)

(56) References Cited

U.S. PATENT DOCUMENTS 8,863,069 B1 * 10/2014 Venkataramani ....... G06F 30/30
716/134
9,817,931 B1 * 11/2017 Gu ....................... G06F 30/3308
(Continued)

FOREIGN PATENT DOCUMENTS

KR 10-2006-0004953 A 1/2006
WO 2021-052391 A1 3/2021

OTHER PUBLICATIONS

Duboscq et al, " An Intermediate Representation for Speculative Optimizations in a Dynamic Compiler", ACM, pp. 1-10 (Year: 2013).*

(Continued)

*Primary Examiner* — Anil Khatri
(74) *Attorney, Agent, or Firm* — Banner & Witcoff, Ltd.

(57) ABSTRACT

Methods, systems, apparatuses, and computer-readable media are disclosed for identifying optimization opportunities for subgraphs representing programs that perform operations on data. Tests may be performed on the subgraph to identify opportunities for fusing one or more nodes, such as more data nodes and/or one or more operations nodes, of the subgraph. For instance, optimization through node fusion may be possible where the subgraph comprises all nodes and all edges in a path between two operations nodes in the subgraph. Based on such identified optimization opportunities, steps such as node fusion may be performed, and these operations may allow for the program to be run in a manner that preserves computing resources without introducing data processing errors.

17 Claims, 11 Drawing Sheets

(58) Field of Classification Search
USPC .............. 717/140–155, 140–156; 706/25–45
See application file for complete search history.

(56) References Cited

U.S. PATENT DOCUMENTS

| | | | | |
|---|---|---|---|---|
| 10,423,733 | B1 * | 9/2019 | Venkataramani ....... | G06F 30/20 |
| 10,901,715 | B1 * | 1/2021 | Raiman ................. | G06F 9/4552 |
| 11,461,662 | B1 * | 10/2022 | Zheng ...................... | G06N 3/08 |
| 11,467,811 | B1 * | 10/2022 | Durakovic .............. | G06F 8/425 |
| 11,681,510 | B2 * | 6/2023 | Dolby ..................... | G06F 8/436 |
| | | | | 717/106 |
| 11,740,456 | B2 * | 8/2023 | Christmas .......... | G02B 27/0103 |
| | | | | 359/13 |
| 12,493,785 | B2 * | 12/2025 | Liu ........................... | G06N 3/08 |
| 2004/0221277 | A1 | 11/2004 | Owen et al. | |
| 2017/0124452 | A1 | 5/2017 | Tucker et al. | |
| 2021/0295822 | A1 * | 9/2021 | Tomkins ............... | G10L 15/197 |
| 2022/0206765 | A1 | 6/2022 | Geng et al. | |

OTHER PUBLICATIONS

Kunft et al, "An Intermediate Representation for Optimizing Machine Learning Pipelines", ACM, pp. 1-15 (Year: 2019).*

Click et al, "A Simple Graph-Based Intermediate Representation", ACM, pp. 1-15 (Year: 1995).*

Sharifian, et al, "μIR—An intermediate representation for transforming and optimizing the microarchitecture of application accelerators", ACM, pp. 1-15 (Year: 2019).*

Lin et al, "A Compiler Framework for Speculative Analysis and Optimizations", ACM, pp. 1-11 (Year: 2003).*

Barhate et al, "An Approach for Pointer Optimization using SSA based Intermediate Representation", IEEE, pp. 1-4 (Year: 2011).*

Li et al. "The Deep Learning Compiler: A Comprehensive Survey" vol. 1, No. 1, Article . Publication date: Aug. 2020., pp. 1-34.

Geifman "Compilers for Deep Learning: Definition, Pros& Cons, and Popular Examples" Retrieved from the Internet: <URL: <https://deci.ai/blog/graph-compilers>>, printed Dec. 5, 2023, p. 1-28, Apr. 28, 2021.

Oct. 30, 2025 (KR) Office Action, App No. 10-2022-0133269, 6 pages.

Reissmann, Nico, et al., RVSDG: An Intermediate Representation for Optimizing Compilers, 2020 Mar. 2020, 25 pages.

Darte, Alain, et al., Liveness Analysis in Explicitly-Parallel Programs, Proceedings of the 6th International Workshop on Polyhedral Compilation Techniques, Jan. 18, 2016, 6 pages.

Chen, Tianqi, et al., TVM: An Automated End-to-End Optimizing Compiler for Deep Learning, ArXiv: 1802.04799v3, Oct. 5, 2018, 16 pages.

* cited by examiner

METHOD AND SYSTEM FOR DETERMINING OPTIMIZATION APPLICABILITY ON INTERMEDIATE REPRESENTATION FROM PROGRAM

CROSS-REFERENCE TO RELATED APPLICATIONS

The present application is a continuation of International Patent Application No. PCT/KR2022/008506, filed Jun. 15, 2022, which is based upon and claims the benefit of priority to Korean Patent Application No. 10-2021-0077964, filed on Jun. 16, 2021, and Korean Patent Application No. 10-2022-0072638, filed on Jun. 15, 2022. The disclosures of the above-listed applications are hereby incorporated by reference herein in their entirety.

TECHNICAL FIELD

The disclosure relates to a method and system for determining optimization applicability on an intermediate representation from a program, and specifically, to a method and system for receiving a subgraph of an intermediate representation as a query, and determining whether the query is valid and whether optimization is applicable on the subgraph.

BACKGROUND

A program may include data and instructions for performing operations on the data. The simplest way to execute the program is to execute given instructions in sequence, but this involves problems such as that optimization techniques is not applicable because it cannot be executed considering future operations.

To solve this problem, instead of executing given instructions in sequence, an intermediate representation with the same meaning as the program can be constructed, and optimization techniques can be applied on the intermediate representation to transform and execute the same. Optimizing and executing the intermediate representation advantageously saves resources such as execution time and memory usage while maintaining the execution result of the program, but if optimization is performed without considering the operation of the program, there is a shortcoming that problems may occur in the subsequent execution of the program.

SUMMARY

In order to address one or more problems (e.g., the problems described above and/or other problems not explicitly described herein), the present disclosure provides a method for, a non-transitory computer-readable recording medium for storing instructions for, and an apparatus (system) for determining optimization applicability on an intermediate representation from a program.

The present disclosure may be implemented in a variety of ways, including a method, an apparatus (system), or a non-transitory computer-readable recording medium storing instructions.

A method for determining optimization applicability on an intermediate representation from a program may be executed by one or more processors and may include receiving, as a query, a subgraph of the intermediate representation that is a subject of determination of optimization applicability, determining a validity of the query, and if the query is valid, determining optimization applicability on the subgraph, in which the program may include data and a plurality of operations, and the intermediate representation may include a plurality of data nodes, a plurality of operation nodes, and a plurality of edges representing input/output relationships between the plurality of data nodes and the plurality of operation nodes.

The program may include a deep learning program, and the data may include tensor type data.

The method may further include optimizing the subgraph if optimization is applicable on the subgraph.

The optimizing may include fusing at least some nodes of the plurality of operation nodes included in the intermediate representation.

The method may further include generating the intermediate representation from the program, and storing, in a database, a corresponding relationship between the data of the program and the data nodes of the intermediate representation.

The storing, in the database, the corresponding relationship between the data of the program and the data node of the intermediate representation in the database may include storing, in the database, the data of the program and pointer information in which the data of the program points to a data node of the intermediate representation.

The determining the validity of the query may include, if a first data node is included in the subgraph, determining whether both an operation node adjacent to the first data node and an edge incident to the first data node satisfy a first query requirement included in the subgraph, if a first operation node and a second operation node are included in the subgraph and a path is present between the first operation node and the second operation node, determining whether all nodes and all edges on the path satisfy a second query requirement included in the subgraph, and determining that the query is valid if both the first query requirement and the second query requirement are satisfied.

The determining optimization applicability on the subgraph may include, if there is no data of the program that corresponds to any of the data nodes included in the subgraph, determining that there is optimization applicability on the subgraph.

A non-transitory computer-readable recording medium storing instructions for executing a method for determining optimization applicability on an intermediate representation from a program on a computer is provided.

An information processing system is provided, which may include a memory, and one or more processors connected to the memory and configured to execute one or more computer-readable programs included in the memory, in which the one or more programs may include instructions for receiving, as a query, a subgraph of the intermediate representation that is a subject of determination of optimization applicability, determining a validity of the query, and if the query is valid, determining optimization applicability on the subgraph, and the intermediate representation may include a plurality of data nodes, a plurality of operation nodes, and a plurality of edges representing input/output relationships between the plurality of data nodes and the plurality of operation nodes.

According to some examples of the present disclosure, by determining whether optimization is applicable before converting or optimizing the intermediate representation, it is possible to prevent program execution performance from being degraded due to inappropriate optimization.

According to some examples of the present disclosure, by applying the optimization to the intermediate representation and executing the same, it is possible to reduce the execution time or memory usage while maintaining the execution result.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
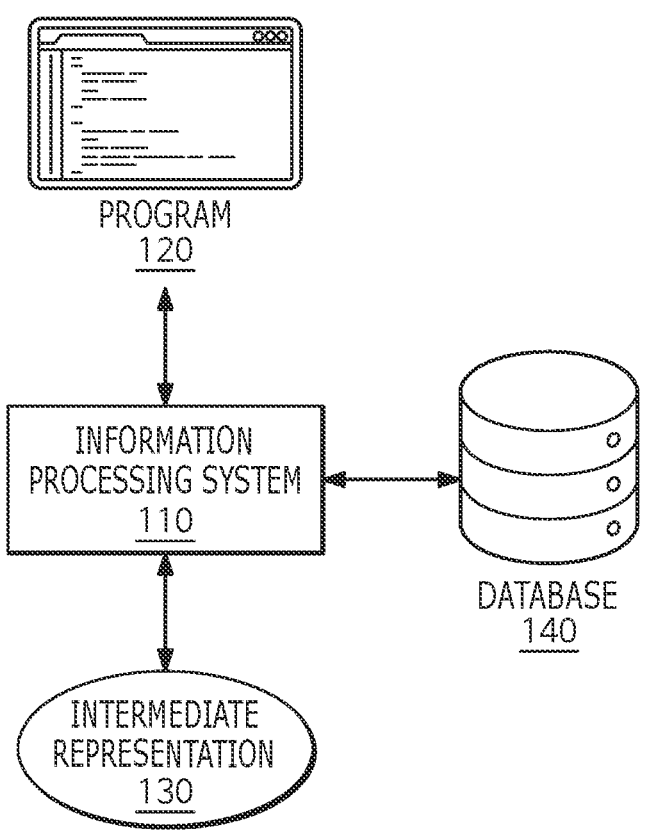
FIG. 1 is a diagram illustrating an example of a method of an information processing system for determining optimization applicability on an intermediate representation.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "part" used herein refers to a software or hardware component, and "module" or "part" performs certain roles. However, the meaning of the "module" or "part" is not limited to software or hardware. The "module" or "part" may be configured to be in an addressable storage medium or configured to play one or more processors. Accordingly, as an example, the "module" or "part" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "parts" may be combined into a smaller number of components and "modules" or "parts", or further divided into additional components and "modules" or "parts."

The "module" or "part" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE- PROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but aspects are not limited thereto. For example, the system may include one or more server apparatus. In another example, the system may include one or more cloud apparatus. In still another example, the system may include both the server apparatus and the cloud apparatus operated in conjunction with each other.

In the present disclosure, "each of a plurality of A" may refer to each of all components included in the plurality of A, or may refer to each of some of the components included in a plurality of A.

In the present disclosure, "intermediate representation" may refer to a graph and/or information associated therewith that has the same meaning as the program and is generated to efficiently execute the program. The intermediate representation may include one or more nodes and one or more edges.

In some examples of the present disclosure, "generating an intermediate representation" or "adding a node or edge to an intermediate representation" may include storing or updating information associated with the intermediate representation in the memory of an information processing system, etc.

In some examples of the present disclosure, "storing in a database" may include storing specific information in the database or updating specific information stored in the database.

FIG. 1 is a diagram illustrating an example of a method of an information processing system 110 for determining optimization applicability on an intermediate representation 130. The information processing system 110 may extract information from a program 120 and generate and/or update the intermediate representation 130 that has the same meaning as the program 120, and store and/or update the corresponding relationship between the program 120 and the intermediate representation 130 in a database 140. For example, the information processing system 110 may extract, from the program 120, information on data and information on operations. As a specific example, the information processing system 110 may extract, from the program 120, information on data such as generation of a new variable or constant, definition and change of variable or constant value, data type of variable or constant, size of variable or constant, deletion or destruction of variable or constant. In addition, the information processing system 110 may extract information on the operation, such as the type of operation being performed, information on input and output data of the operation, parameters of the operation, etc.

The program 120 may refer to any program that includes data and operations, and may include a deep learning program, for example. In addition, the data may be implemented as any data type that may construct a (deep learning) program, and may include, for example, tensor type data, etc. The information processing system 110 may extract information on the data type, size of each dimension, etc. from the tensor type data included in the deep learning program.

The information processing system 110 may generate and/or update the intermediate representation 130 from the program 120 using the information extracted from the program 120. The intermediate representation 130 may be represented in the form of a graph including nodes and edges. For example, the data and operations extracted from the program 120 may be represented as nodes, and the input/output relationship between the data and operations may be represented as edges. In addition, the information processing system 110 may store and/or update the corresponding relationship between the program 120 and the intermediate representation 130 in the database 140.

For example, the information processing system 110 may extract information on tensors and information on operations from the deep learning program 120. If a new tensor is generated in the program 120, the information processing system 110 may add a data node corresponding to the corresponding tensor to the intermediate representation 130, and may store the corresponding relationship between the tensor of the program 120 and the data node of the intermediate representation 130 (e.g., pointer information where the tensor of the program points to the data node of the intermediate representation) in the database 140. In addition, if the tensor is updated to a new tensor in the program 120, the intermediate representation 130 may be updated and the corresponding relationship stored in the database 140 may be updated. If the information on the operation (information on the type of operation, the input/output tensor, etc.) is extracted from the program 120, an operation node may be added to the intermediate representation 130, and an edge representing the input/output relationship between the tensor and the operation may be added.

As described above, when forming the intermediate representation 130 for the program 120, by applying optimization on the intermediate representation 130 and executing the same instead of executing the instructions of the program 120 in sequence, it is possible to reduce the execution time or memory usage while maintaining the execution result. For example, when executing the intermediate representation 130 using a graphics processing unit (GPU), multiple operations may be fused and executed as a single operation, so that memory access can reduced and performance can be enhanced. Meanwhile, such optimization is not always possible, and optimization should be performed taking into account the subsequent operation of the program 120. Accordingly, prior to performing optimization, the information processing system 110 may determine whether optimization is applicable on at least a portion of the intermediate representation 130.

The information processing system 110 may receive a subgraph of the intermediate representation 130 as a query and determine whether optimization is applicable on the received subgraph. Optimization may include fusing (operation fusion) at least some of the operation nodes included in the intermediate representation 130.

The information processing system 110 may determine the validity of the query before determining whether optimization is applicable on the subgraph. For example, it may be determined whether the subgraph received as a query is an appropriate subgraph to determine the optimization applicability. The information processing system 110 may determine the optimization applicability on the subgraph.

As described above, by determining whether optimization is possible before converting or optimizing the intermediate representation 130, it is possible to prevent the execution performance of the program 120 from being deteriorated due to inappropriate optimization.

Figure 2:
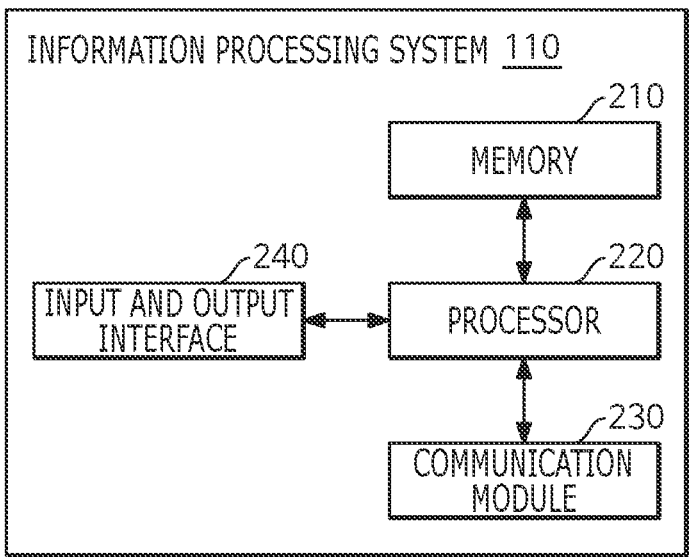
FIG. 2 is a block diagram illustrating an internal configuration of the information processing system.

FIG. 2 is a block diagram illustrating an internal configuration of the information processing system 110. The information processing system 110 may include a memory 210, a processor 220, a communication module 230, and an input and output interface 240. As illustrated in FIG. 2, the information processing system 110 may be configured to communicate information and/or data through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, and so on. In another example, a non-destructive mass storage device such as ROM, SSD, flash memory, disk drive, etc. may be included in the information processing system 110 as a separate permanent storage device that is distinct from the memory. In addition, the memory 210 may store an operating system and at least one program code (e.g., code installed and driven in the information processing system 110 for generating and updating intermediate representation, determining the validity of queries, determining optimization applicability, applying optimization, etc.).

These software components may be loaded from a computer-readable recording medium separate from the memory 210. Such a separate computer-readable recording medium may include a recording medium directly connectable to the information processing system 110, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., program for generating and updating intermediate representations, determining the validity of queries, determining optimization applicability, applying optimization, etc.) installed by files provided through the communication module 230 by a developer or by a file distribution system that distributes application installation files.

The processor 220 may be configured to process the instructions of the computer program by performing basic arithmetic, logic, and input and output operations. The commands may be provided to a user terminal (not illustrated) or another external system by the memory 210 or the communication module 230. For example, the processor 220 may receive a subgraph of an intermediate representation as a query, determine the validity of the query by determining at least one condition, and determine the optimization applicability on the subgraph if the query is valid.

The communication module 230 may provide a configuration or function for the user terminal (not illustrated) and the information processing system 110 to communicate with each other through a network, and may provide a configuration or function for the information processing system 110 to communicate with an external system (e.g., a separate cloud system). For example, control signals, commands, data, and the like provided under the control of the processor 220 of the information processing system 110 may be transmitted to the user terminal and/or the external system through the communication module 230 and the network through the communication module of the user terminal and/or an external system. For example, the user terminal and/or an external system may receive a result of determining optimization applicability, a program execution result, etc. from the information processing system 110.

In addition, the input and output interface 240 of the information processing system 110 may be a means for interfacing with an apparatus (not illustrated) for inputting or outputting, which may be connected to the information processing system 110 or included in the information processing system 110. In FIG. 2, the input and output interface 240 is illustrated as a component configured separately from the processor 220, but aspects are not limited thereto, and the input and output interface 240 may be configured to be included in the processor 220. The information processing system 110 may include more components than those illustrated in FIG. 2. Meanwhile, most of the related components may not necessarily require exact illustration.

The processor 220 of the information processing system 110 may be configured to manage, process, and/or store the information and/or data received from a plurality of user terminals and/or a plurality of external systems. The processor 220 may receive a subgraph of an intermediate representation as a query from a user terminal and/or an external system. In this case, the processor 220 may determine the validity of the query, and if the query is valid, may determine the optimization applicability on the subgraph.

Figure 3:
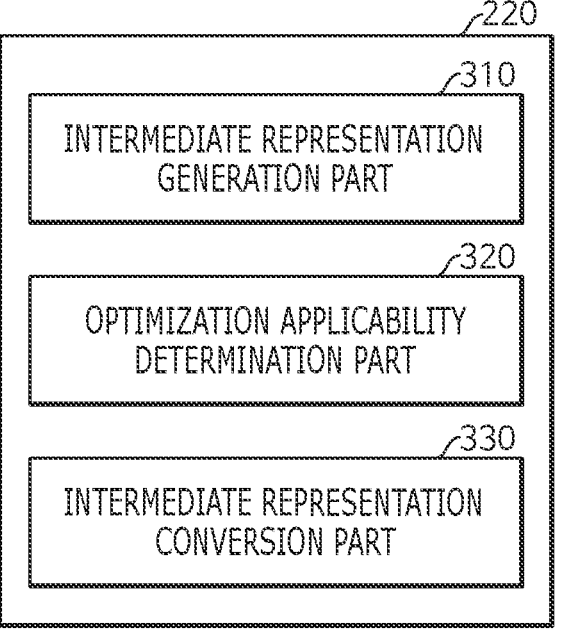
FIG. 3 is a block diagram of an internal configuration of a processor.

FIG. 3 is a block diagram illustrating an internal configuration of the processor 220. As illustrated, the processor 220 may include an intermediate representation generation part 310, an optimization applicability determination part 320, and an intermediate representation conversion part 330. The internal configuration of the processor 220 illustrated in FIG. 3 is merely an example and may be implemented differently in some examples. For example, the processor 220 may further include other configurations than those illustrated, and at least part of the illustrated configurations may be omitted. In addition, FIG. 3 illustrates that the processor 220 is a single processor, but aspects are not limited thereto, and may include a plurality of processors. In addition, FIG. 3 illustrates that the processor is divided into individual parts from a functional perspective, but this does not necessarily mean that the processor is physically separated.

The intermediate representation generation part 310 may extract, from the program, the information on data and the information on operations. For example, the intermediate representation generation part 310 may extract, from the program, the information on data such as generation of a new variable or constant, definition and change of variable or constant value, data type of variable or constant, size of variable or constant, deletion or destruction of variable or constant. In addition, the intermediate representation generation part 310 may extract the information on the operation, such as the type of operation being performed, information on input and output data of the operation, parameters of the operation, etc.

For example, the program may refer to any program that includes data and operations, and may include a deep learning program, etc., for example. In addition, the data may be implemented as any data type that may construct a (deep learning) program, and may include, for example, tensor type data, etc. The intermediate representation generation part 310 may extract information on the data type, size of each dimension, etc. from tensor type data included in the deep learning program.

The intermediate representation generation part 310 may generate an intermediate representation using the information extracted from the program, and store or update the generated intermediate representation. The intermediate representation may be represented in the form of a graph including nodes representing the data and operations and edges representing the input/output relationships between the data and operations. The intermediate representation may be stored in the memory of the information processing system, the database, etc., but aspects are not limited thereto.

Additionally, the intermediate representation generation part 310 may store and/or update the corresponding relationship between the program and the intermediate representation in the database. The process of the intermediate representation generation part 310 storing or updating the corresponding relationship between the program and the intermediate representation may be performed simultaneously, overlappingly, or sequentially with the process of generating, storing, or updating the intermediate representation.

For example, the intermediate representation generation part 310 may extract, from a deep learning program, information in which a new tensor is generated, add a data node corresponding to the generated tensor to the intermediate representation, and store, in the database, information in which the generated tensor of the program corresponds to the data node of the added intermediate representation. The corresponding relationship between the program and the intermediate representation may be stored as pointer information in which the tensor of the program points to a data node of the intermediate representation. In addition, if the intermediate representation generation part 310 extracts, from the deep learning program, the information in which the tensor is updated to a new tensor, the intermediate representation generation part 310 may add a new data node to the intermediate representation, and modify the corresponding relationship so that the updated tensor of the program corresponds to the added data node of the intermediate representation. That is, the intermediate representation generation part 310 may also update the corresponding relationship between the program and the intermediate representation.

As another example, the intermediate representation generation part 310 may extract the information on operation from the program, add an operation node to the intermediate representation, and add an edge extending from the input data node corresponding to the extracted input data of the operation to the operation node, and an edge extending from the operation node to the output data node corresponding to the output data of the operation.

The optimization applicability determination part 320 may receive a subgraph of the intermediate representation as a query and determine validity of the query and also optimization applicability. The optimization may include fusing (operation fusion) at least some of the operation nodes included in the intermediate representation.

The optimization applicability determination part 320 may determine the validity of the query before determining whether the optimization is applicable on the subgraph. For example, the optimization applicability determination part 320 may determine whether the subgraph received as the query is an appropriate subgraph for determining the optimization applicability.

As a specific example, in order to determine whether the operation fusion is possible, the optimization applicability determination part 320 may determine the validity of the query by determining whether the following first and second query requirements are satisfied for the received subgraph. The first query requirement for operation fusion optimization requires that, if any data node is included in the subgraph, both the operation node adjacent to the corresponding data node and the edge incident to the corresponding data node be included in the subgraph. In other words, the condition that the edge node of the subgraph should be the operation node is the first query requirement for the operation fusion optimization. In addition, the second query requirement for operation fusion optimization requires that, if the first and second operation nodes are included in the subgraph and a path is present between the first operation node and the second operation node, all nodes and all edges on the path be included in the subgraph. In other words, the second query requirement for operation fusion optimization requires that, if there is a dependency between operation nodes, only continuous parts be fusible. An example of a method of the optimization applicability determination part 320 for determining the validity of the query will be described in more detail below with reference to FIGS. 5 and 9.

If the determination on the validity of the query using the methods such as the example described above indicates that the query is valid, the optimization applicability determination part 320 may determine the optimization applicability on the subgraph. For example, the optimization applicability determination part 320 may determine whether there is no disruption in the future execution of the program if optimization is applied on the subgraph. As a specific example, the optimization applicability determination part 320 may determine whether there is no data of the program that corresponds to any of the data nodes included in the subgraph, and if there is no data of the program that corresponds to any of the data nodes included in the subgraph, may determine that there is optimization applicability. The intermediate data nodes may be removed when the optimization of operation fusion is performed, but if the conditions described above are not met, it means that there is a possibility that the program would access the intermediate data nodes later, and in this case, optimization is not applicable. An example of a method of the optimization applicability determination part 320 for determining the optimization applicability will be described in more detail below with reference to FIGS. 6 and 10.

The intermediate representation conversion part 330 may receive information on whether optimization is applicable on the subgraph of the intermediate representation from the optimization applicability determination part 320 and apply optimization on the corresponding subgraph. For example, the intermediate representation conversion part 330 may receive a determination from the optimization applicability determination part 320 that optimization of operation fusion is possible for the subgraph of the intermediate representation, and may apply optimization of operation fusion on the corresponding subgraph.

Figure 4:
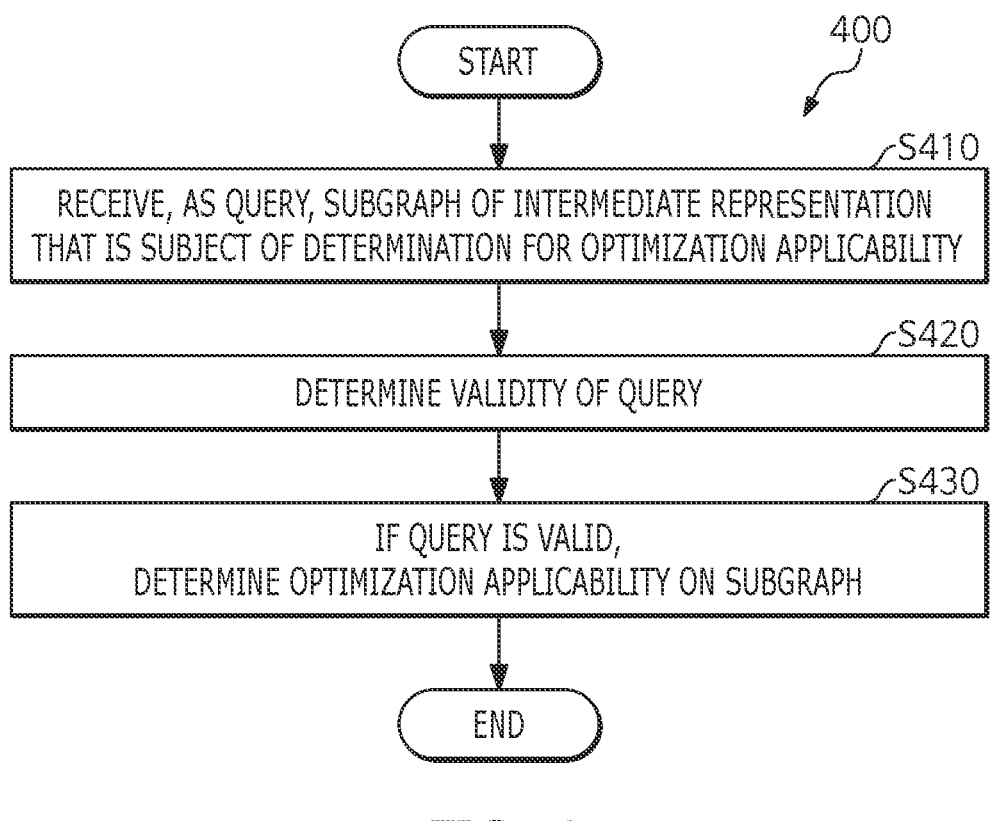
FIG. 4 is a flowchart illustrating an example of a method for determining optimization applicability on an intermediate representation from a program.

FIG. 4 is a flowchart illustrating an example of a method 400 for determining optimization applicability on an intermediate representation from a program. The method 400 may be initiated by a processor (e.g., a processor of an information processing system) receiving, as a query, a subgraph of an intermediate representation that is the subject of the optimization applicability determination, at S410. The optimization may include operation fusion that fuses at least some nodes of a plurality of operation nodes included in the intermediate representation.

The intermediate representation may refer to a graph and/or information associated therewith that has the same meaning as the program and is generated to efficiently execute the program. The program may include data and a plurality of operations, and for example, the program may include a deep learning program, and the data may include tensor type data. The intermediate representation may include a plurality of data nodes, a plurality of operation nodes, and a plurality of edges representing input/output relationships between the plurality of data nodes and the plurality of operation nodes.

The processor may determine the validity of the query, at S420. For example, the processor may determine that the query is valid if both the first and second query requirements below are satisfied. The first query requirement requires that, if a first data node is included in the subgraph, all of the operation nodes adjacent to the first data node and all of the edges incident to the first data node be included in the subgraph. In addition, the second query requirement requires that, if the first and second operation nodes are included in the subgraph and a path exists between the first operation node and the second operation node, all nodes and all edges on the path be included in the subgraph. That is, the processor may determine that the query is valid only if it satisfies both of the first query requirement requiring that the edge node of the subgraph be the operation nodes, and the second query requirement requiring that, if there is a dependency between operation nodes, only the continuous part be subject to optimization. An example of a method of the processor for determining the validity of a query will be described in more detail below with reference to FIGS. 5 and 9.

If the query is valid, the processor may determine the optimization applicability on the subgraph, at S430. For example, if there is no data of the program that corresponds to any of the data nodes included in the subgraph, the processor may determine that there is optimization applicability on the subgraph. In other words, if there is no possibility that the program would access any data node in the subgraph later, it may be determined that there is optimization applicability on the subgraph. An example of a method of the processor for determining the optimization applicability will be described in more detail below with reference to FIGS. 6 and 10.

In this way, by determining whether optimization is applicable before optimizing the intermediate representation, it is possible to prevent program execution performance from being degraded due to inappropriate optimization.

Figure 5:
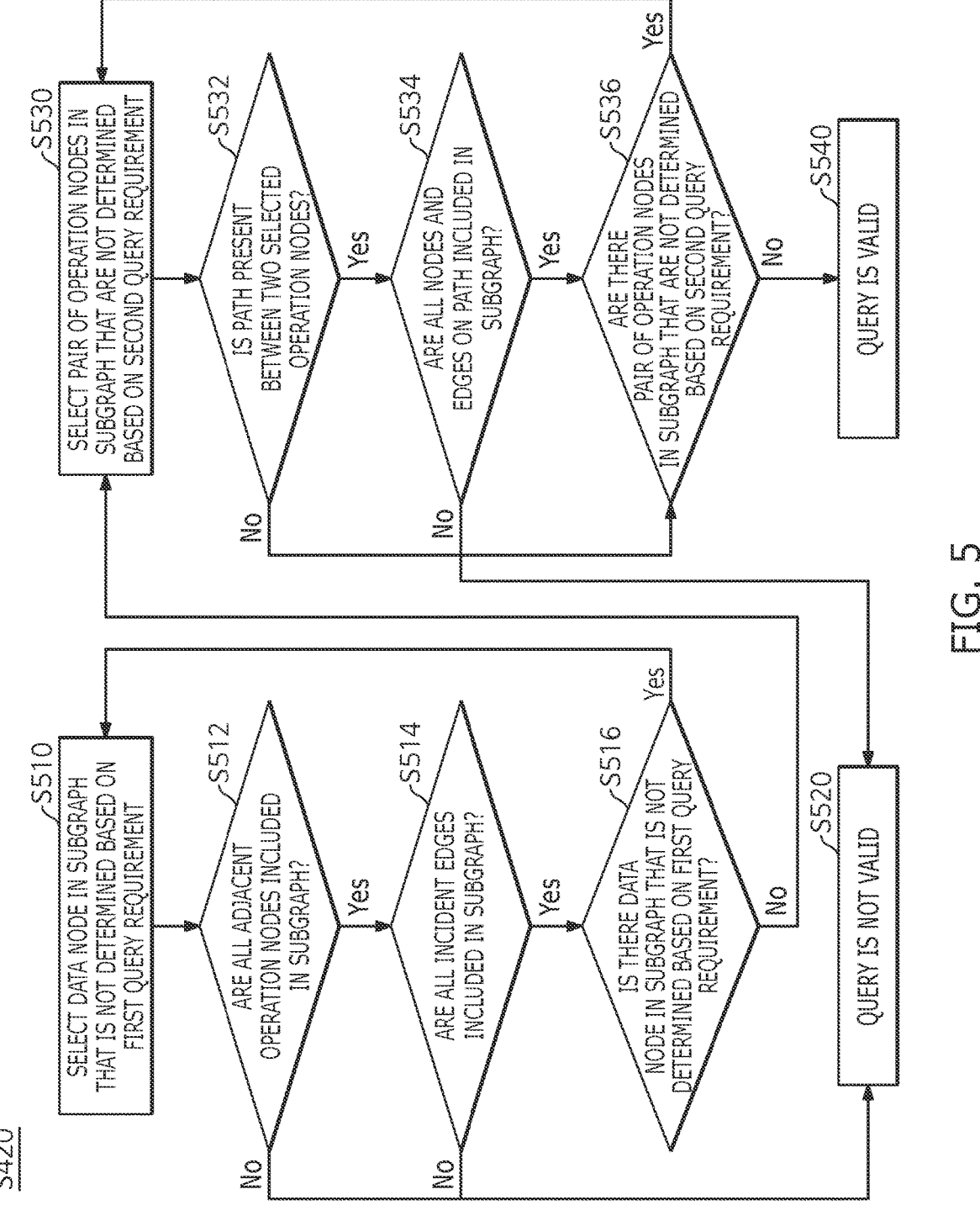
FIG. 5 is a flowchart illustrating an example of a method for determining validity of a query.

FIG. 5 is a flowchart illustrating an example of a method (S420) for determining the validity of a query. The processor may determine whether the first and second query requirements are satisfied, and determine that the query is valid only if both the first and second query requirements are satisfied. The first query requirement requires that, if a specific data node is included in the subgraph, both the operation node adjacent to the corresponding data node and the edges incident to the corresponding data node be included in the subgraph. In addition, the second query requirement requires that, if a specific pair of operation nodes is included in the subgraph and a path is present between the corresponding pair of operation nodes, all nodes and all edges on the path be included in the subgraph. That is, the processor may determine that the query is valid only if it satisfies both of the first query requirement requiring that the edge node of the subgraph be the operation nodes, and the second query requirement requiring that, if there is a dependency between operation nodes, only the continuous part be subject to optimization.

In order to first determine whether the first query requirement is satisfied, the processor may select a data node in the subgraph which is not determined based on the first query requirement, at S510. It may be determined whether all operation nodes adjacent to the selected data node are included in the subgraph, at S512. If there is at least one operation node, among the operation nodes adjacent to the selected data node, that is not included in the subgraph, the processor may determine that the query is not valid, at S520, and end determining the validity of the query.

If all adjacent operation nodes are included in the subgraph, the processor may determine whether all edges incident to the selected data node are included in the subgraph, at S514. If there is at least one edge, among the edges incident to the selected data node, that is not included in the subgraph, the processor may determine that the query is not valid, at S520, and end determining the validity of the query.

If all incident edges are included in the subgraph, the processor may complete the determination based on the first query requirement for the selected data node and determine whether there is a data node in the subgraph that is not determined based on the first query requirement, at S516. If there is a data node in the subgraph that is not determined based on the first query requirement, the process may return to step S510 and the new data node may be determined based on the first query requirement. In this way, all data nodes in the subgraph may be determined as to whether they satisfy the first query requirement, and if all data nodes in the subgraph satisfy the first query requirement, the processor may determine the second query requirement.

In order to determine whether the second query requirement is satisfied, the processor may select a pair of operation nodes in the subgraph that are not determined based on the second query requirement, at S530. The processor may determine whether a path is present between the two selected operation nodes, at S532, and if there is a path, determine whether all nodes and edges on the path are included in the subgraph, at S534. If there is at least one node or edge on the path that is not included in the subgraph, the processor may determine that the query is not valid at S520, and end determining the validity of the query.

If there is no path existing between the two operation nodes at S532, or if all nodes and edges on the path are included in the subgraph at S534, the processor may complete determining the selected pair of operation nodes based on the second query requirement, and determine whether there is a pair of operation nodes in the subgraph that are not determined based on the second query requirement, at S536. If there is a pair of operation nodes in the subgraph that are not determined based on the second query requirement, the process may return to S530 and determine the new pair of operation nodes based on the second query requirement. In this way, it may be determined whether all pairs of operation nodes in the subgraph satisfy the second query requirement, and if all pairs of operation nodes in the subgraph satisfy the second query requirement, the processor may determine that the query is valid, and the method S420 may be ended, at S540.

Figure 6:
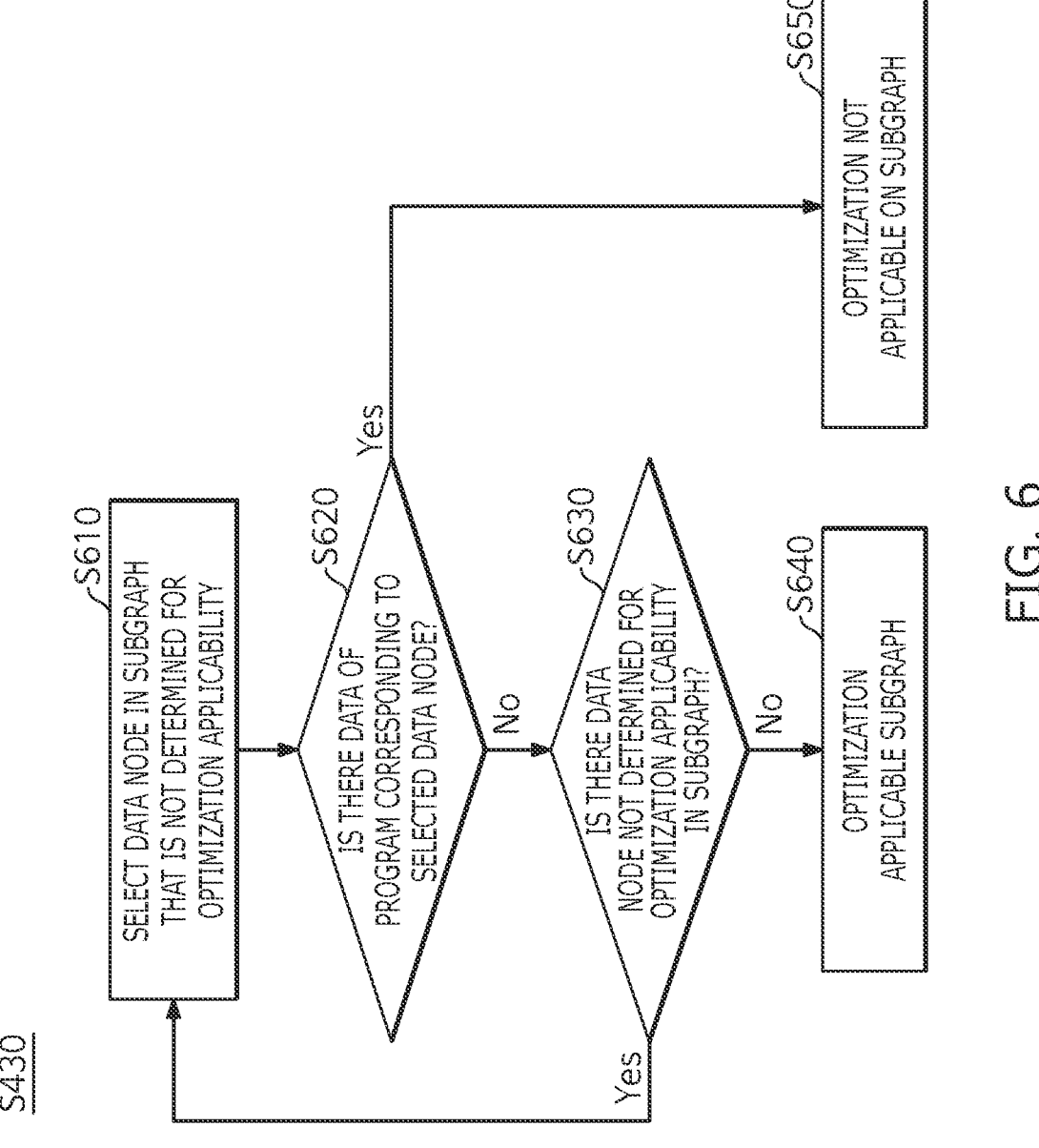
FIG. 6 is a flowchart illustrating an example of a method for determining optimization applicability.

FIG. 6 is a flowchart illustrating an example of a method S430 for determining optimization applicability. The processor may determine the optimization applicability on the subgraph. For example, if there is no data of the program that corresponds to any of the data nodes included in the subgraph, the processor may determine that there is optimization applicability. In other words, if there is no possibility that the program would access any data node in the subgraph later, it may be determined that there is optimization applicability on the subgraph. The intermediate data nodes may be removed when the optimization of operation fusion is performed, but if there is a possibility that the program would access intermediate data nodes later, applying optimization may result in disruption in the execution of the program.

In order to first determine the optimization applicability, the processor may select a data node in the subgraph that is not determined for the optimization applicability, at S610. It may be determined whether there is data of the program corresponding to the selected data node, at S620. If there is data of the program corresponding to the selected data node, the processor may determine that optimization is not applicable at S650, and end determining the optimization applicability.

If there is no data of the program corresponding to the selected data node, the processor may determine whether there is a data node in the subgraph that is not determined for the optimization applicability, at S630. If there is a data node in the subgraph that is not determined for the optimization applicability, the process may return to step S610 and determine the optimization applicability on the new data node. In this way, all data nodes in the subgraph may be determined, and if there is no data of the program that corresponds to any of the data nodes in the subgraph, the processor may determine that optimization is applicable on the subgraph, and end the method S430, at S640.

Figure 7:
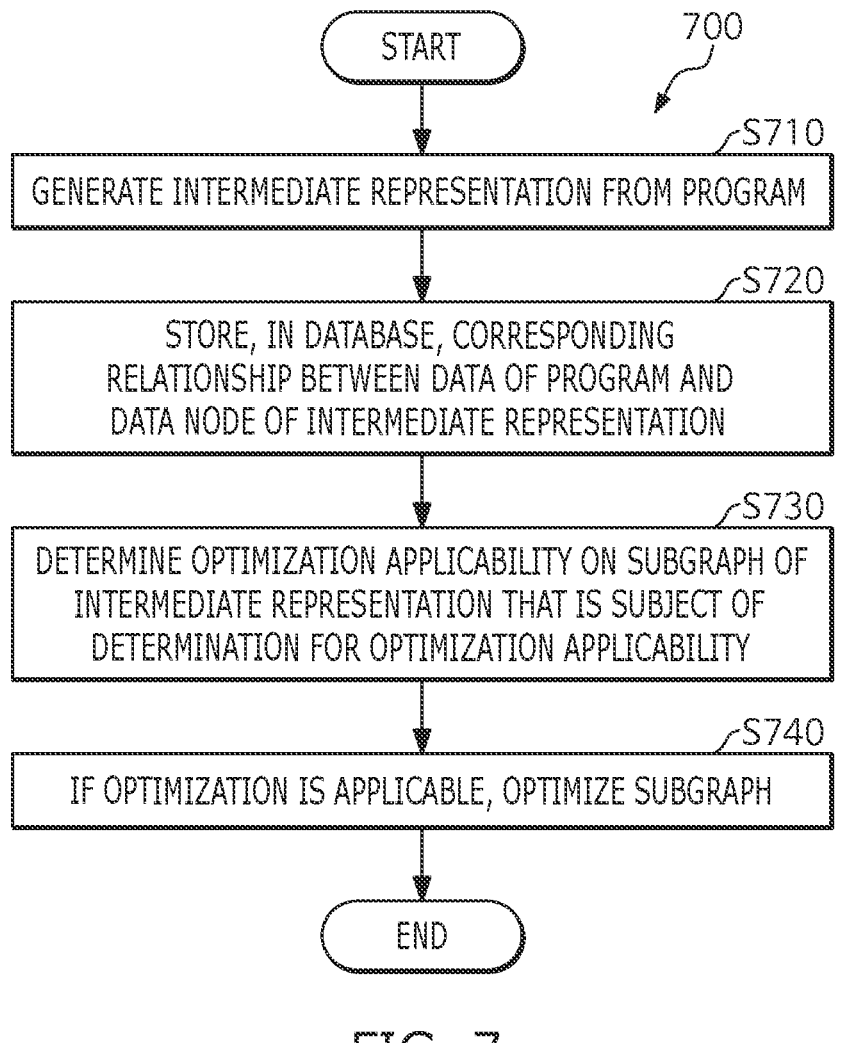
FIG. 7 is a flowchart illustrating an example of a method for determining optimization applicability on an intermediate representation from a program.

FIG. 7 is a flowchart illustrating an example of a method 700 for determining optimization applicability on an intermediate representation from a program. According to the method 700, the processor (e.g., the processor of the information processing system) may generate an intermediate representation from a program, at S710, and store, in a database, the corresponding relationship between the data of the program and the data nodes of the intermediate representation, at S720. The intermediate representation may refer to a graph and/or information associated therewith that has the same meaning as the program and is generated to efficiently execute the program. The intermediate representation may include a plurality of data nodes, a plurality of operation nodes, and a plurality of edges representing input/output relationships between the plurality of data nodes and the plurality of operation nodes.

As an example of generating an intermediate representation and storing the corresponding relationship in a database, the processor may extract, from the deep learning program, information on the tensor and information on the operation, and if a new tensor is generated in the program, the processor may add a data node corresponding to the corresponding tensor to the intermediate representation. In addition, the corresponding relationship between the tensor of the program and the data node of the intermediate representation (e.g., pointer information in which the tensor of the program points to the data node of the intermediate representation) may be stored in the database. If the tensor in the program is updated with a new tensor, the processor may update the intermediate representation and update the corresponding relationship stored in the database. In addition, if the information on operation (type of operation, information on input/output tensors, etc.) is extracted from the program, the processor may add an operation node to the intermediate representation and add an edge representing the input/output relationship between the tensor and the operation.

The processor may determine the optimization applicability on a subgraph of the intermediate representation that is the subject of the determination of optimization applicability, at S730. The detailed process of step S730 may be performed in the same or similar manner as the method 400 of FIG. 4.

If optimization is applicable, the processor may optimize the subgraph, at S740. For example, the processor may fuse at least some nodes of a plurality of operation nodes included in the intermediate representation to optimize the subgraph. In this way, if multiple operations are fused into one operation for execution, memory access can be reduced and program execution performance can be enhanced.

The flowcharts illustrated in FIGS. 4 to 7 and the description described above are merely examples and aspects are not limited thereto and may be implemented in various ways. For example, one or more steps may be omitted, the order of each step may be changed, and at least some steps may be performed repeatedly or may be performed overlappingly.

Figure 8:
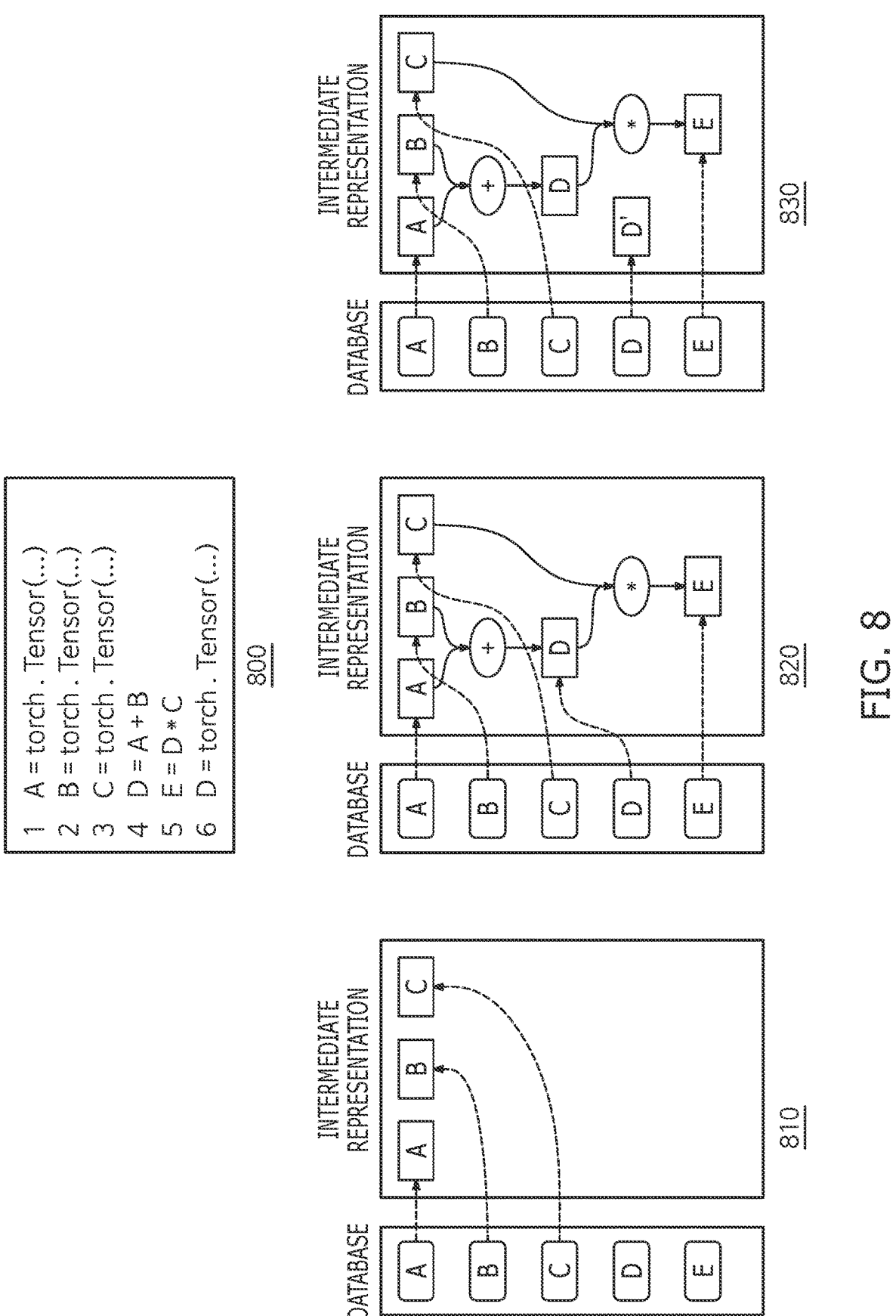
FIG. 8 is a diagram illustrating an example of a method for generating an intermediate representation for a program.

FIG. 8 is a diagram illustrating an example of a method for generating an intermediate representation from a program 800. The information processing system may extract, from the program 800, information on data and information on operations, and generate an intermediate representation using the extracted information, and store the corresponding relationship between the program 800 and the intermediate representation in a database.

As a specific example, an intermediate representation for the program 800 may be generated through first to third states 810, 820, and 830, and the corresponding relationship between the program and the intermediate representation may be stored in the database. The first state 810 represents an example of a state in which the information processing system generates an intermediate representation up to the third line of the program 800 and stores the corresponding relationship. The information processing system may extract information on newly generated tensor A, tensor B, and tensor C from the program 800, add corresponding data node A, data node B, and data node C to the intermediate representation, and store the corresponding relationship between the tensors of the program 800 and the data nodes of the intermediate representation in the database.

The second state 820 represents an example of a state after the first state 810, in which the information processing system generates an intermediate representation up to the fifth line of the program 800 and stores the corresponding relationship between the program 800 and the intermediate representation. The information processing system may extract information on operation "+" from the fourth line of the program 800, add an operation node "+", a data node D corresponding to the output data (tensor D) of the operation, and three edges representing the input/output relationship of the operation "+" to the intermediate representation, and store, in the database, information in which the tensor D of a program 900 and the data node D of the intermediate representation correspond to each other. In addition, the information processing system may extract information on operation "*" from the fifth line of the program 800, and add an operation node "*", a data node E corresponding to the output data (tensor E) of the operation, and three edges representing the input/output relationship of the operation "*" to the intermediate representation, and store, in the database, information in which the tensor E of the program 800 and the data node E of the intermediate representation correspond to each other.

The third state 830 represents an example of a state after the second state 820, in which an intermediate representation is generated up to the sixth line of the program 900 and the corresponding relationship between the program 800 and the intermediate representation is updated accordingly. The information processing system may extract, from line 6 of the program 800, the information in which the tensor D is updated to a new tensor, and add the data node D' corresponding to the updated tensor D to the intermediate representation. In addition, the information processing system may update the corresponding relationship stored in the database so that the tensor D of the program 800 corresponds to the data node D' of the intermediate representation.

Figure 9:
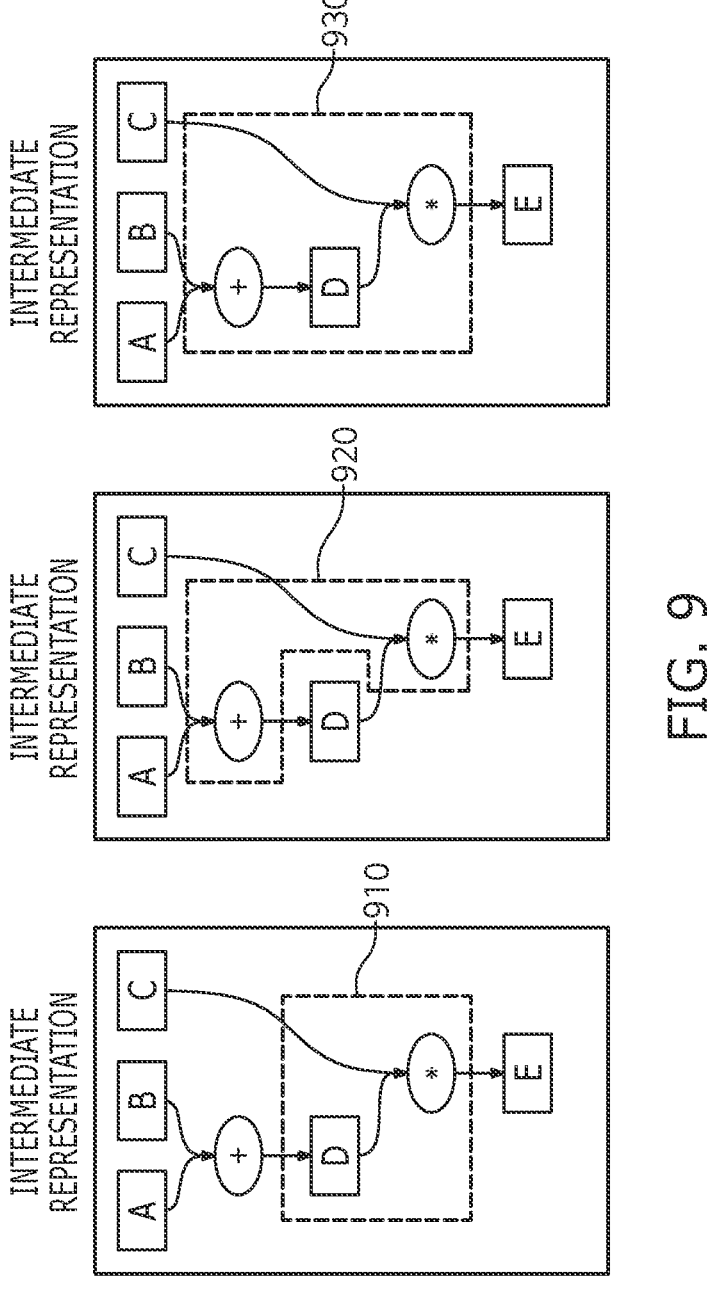
FIG. 9 is a diagram illustrating an example of a method for determining validity of a query.

FIG. 9 is a diagram illustrating an example of a method for determining validity of a query. The information processing system may receive, as a query, subgraphs 910, 920, and 930 of the intermediate representation that is the subject of the determination of optimization applicability and determine the validity of the query.

For example, the processor may determine whether the first and second query requirements are satisfied, and determine that the query is valid only if both the first and second query requirements are satisfied. The first query requirement requires that, if a specific data node is included in the subgraphs 910, 920, and 930, both the operation node adjacent to the corresponding data node and the edges incident to the corresponding data node be included in the subgraphs 910, 920, and 930. In addition, the second query requirement requires that, if a specific pair of operation nodes is included in the subgraphs and a path is present between the corresponding pair of operation nodes, all nodes and all edges on the path be included in the subgraphs 910, 920, and 930. That is, the processor may determine that the query is valid only if it satisfies both of the first query requirement requiring that the edge node of the subgraphs 910, 920, and 930 be the operation nodes, and the second query requirement requiring that, if there is a dependency between operation nodes, only the continuous part be subject to optimization.

FIG. 9 illustrates an example of the subgraphs 910, 920, and 930 the information processing system receives as a query. Referring to the first subgraph 910, data node D is included in the subgraph, but the operation node "+" adjacent to data node D is not included in the subgraph. That is, the edge node does not end at the operation node, and the first subgraph 910 does not satisfy the first query requirement.

Referring to the second subgraph 920, both the operation node "+" and the operation node "*" are included in the subgraph, but the data node D on the path between the two operation nodes is not included in the subgraph. That is, although the second subgraph 920 includes two operation nodes with dependency, it is not continuous, so the second subgraph 920 does not satisfy the second query requirement.

Referring to the third subgraph 930, both the operation nodes adjacent to the data node D and the edges incident to data node D included in the subgraph are included in the subgraph, thus satisfying the first query requirement, and all nodes and edges on the path between two operation nodes included in the subgraph are included in the subgraph, thus satisfying the second query requirement. That is, the information processing system may determine that the query including the third subgraph 930 is valid.

Figure 10:
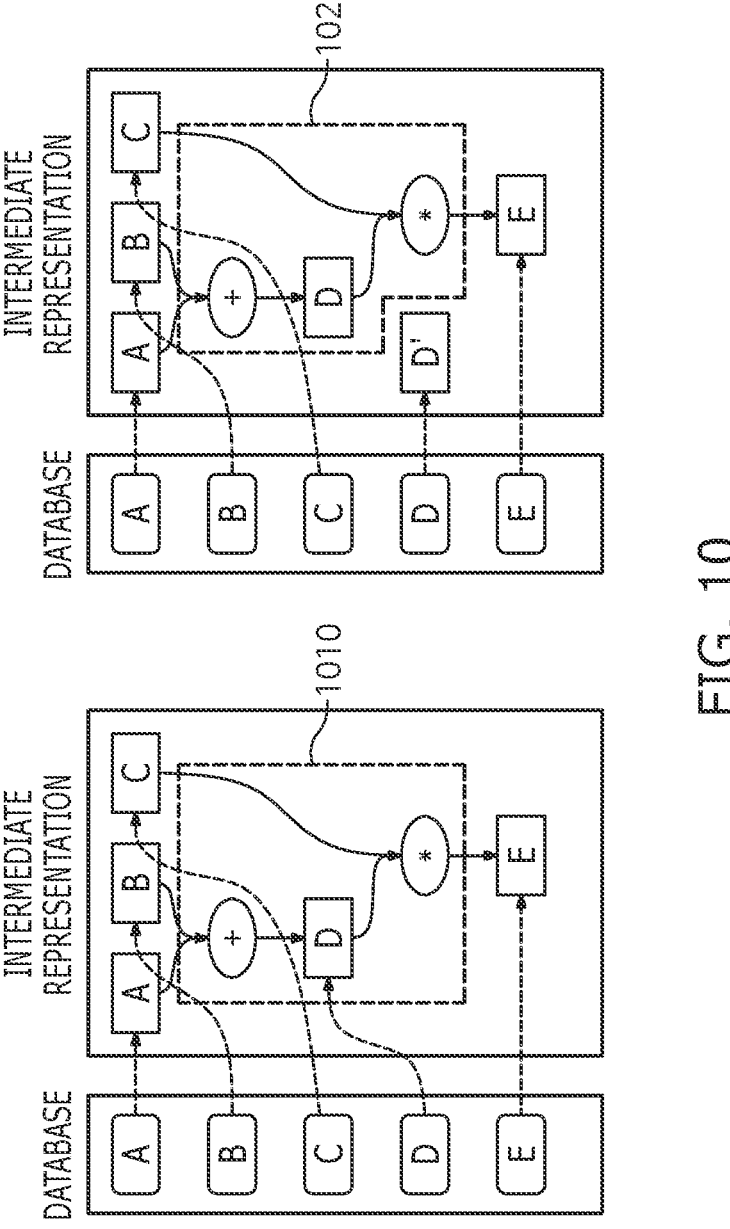
FIG. 10 is a diagram illustrating an example of a method for determining optimization applicability.

FIG. 10 is a diagram illustrating an example of a method for determining optimization applicability. The information processing system may determine that there is optimization applicability if there is no data of the program that corresponds to any of the data nodes included in subgraphs 1010 and 1020. That is, if there is no possibility of the program accessing any of the data nodes in the subgraphs 1010 and 1020 later, it may be determined that there is optimization applicability on the subgraphs 1010 and 1020. The intermediate data nodes may be removed when the optimization of operation fusion is performed, but if there is a possibility that the program would access intermediate data nodes later, applying optimization may result in disruption in the execution of the program.

FIG. 10 illustrates an example of a database storing the subgraphs 1010 and 1020 that the information processing system received as queries and the corresponding relationship. Referring to the first subgraph 1010, there is data D of the program that corresponds to data node D included in the subgraph. Accordingly, the possibility that the program may access the data node D later cannot be excluded, and the information processing system may determine that optimization is not applicable on the first subgraph 1010.

Referring to the second subgraph 1020, there is no data of the program that corresponds to data node D included in the subgraph. Accordingly, since there is no possibility that the program will access the data node D later, the information processing system may determine that optimization is applicable on the second subgraph 1020.

Figure 11:
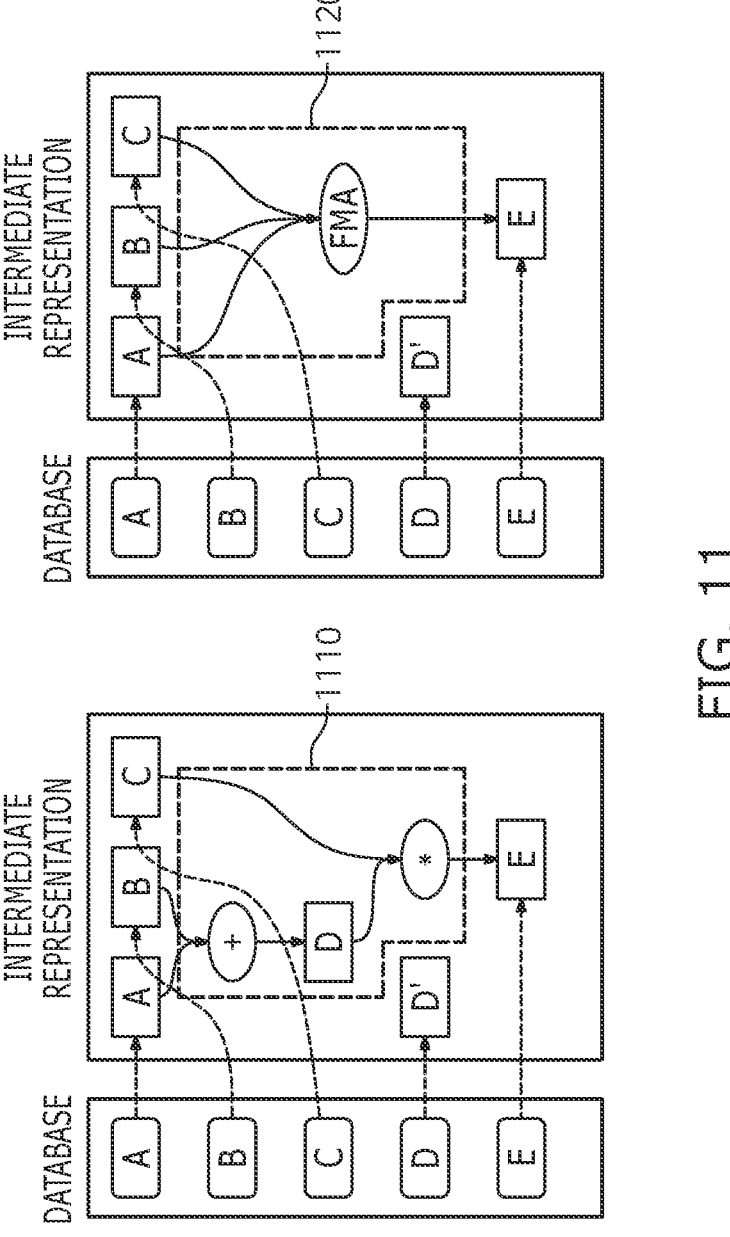
FIG. 11 is a diagram illustrating an example of a method for optimizing at least a portion of an intermediate representation.

FIG. 11 is a diagram illustrating an example of a method for optimizing at least a portion of an intermediate representation. If optimization is applicable on the subgraph, the information processing system may optimize the subgraph. For example, the information processing system may fuse at least some nodes of a plurality of operation nodes included in the intermediate representation to optimize the subgraph.

As a specific example, as illustrated, the information processing system may fuse the operation node "+" and the operation node "*" included in a subgraph 1110 into one operation node 'Fused Multiply-Add (FMA)" to convert the intermediate representation. In this way, by applying optimization to the intermediate representation and then executing the result instead of executing the program instructions in sequence, it is possible to reduce execution time or memory usage while maintaining the execution result. For example, when executing the optimized intermediate representation 1120 using a graphics processing unit (GPU), multiple operations may be fused and executed as a single operation, so that memory access can reduced and performance can be enhanced.

The method described above may be provided as a computer program stored in a computer-readable recording medium for execution on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method executed by one or more processors, the method comprising:

receiving, as a query, a subgraph of an intermediate representation that is a subject of a determination of optimization applicability,
wherein the intermediate representation is an intermediate representation of a program executable by one or more computing devices,
wherein the program comprises data and a plurality of operations, and,
wherein the intermediate representation comprises:
  a plurality of data nodes;
  a plurality of operation nodes; and
  a plurality of edges each representing an input/output relationship between at least one of the plurality of data nodes and at least one of the plurality of operation nodes;
determining that the subgraph may be optimized through operation fusion by determining a possibility that the program will access intermediate data nodes at a future time; and
performing, based on the determining that the query may be optimized through operation fusion, optimization on the subgraph by fusing at least two of the plurality of operation nodes;
wherein the determining that the query may be optimized through operation fusion further comprises: determining a possibility that the program will access intermediate data nodes at a future time.

2. The method according to claim 1,
wherein the program comprises at least one of:
  a program associated with tensors; or
  a deep learning program, and
wherein the data comprises at least one of:
  tensor type data, or
  data of the deep learning program.

3. The method according to claim 1, wherein the performing the optimization comprises:
generating a modified subgraph by removing, from the subgraph, one or more nodes.

4. The method according to claim 1, further comprising:
generating the intermediate representation from the program; and
storing, in a database, a corresponding relationship between at least a portion of the data of the program and the data nodes of the intermediate representation.

5. The method according to claim 4, wherein the storing, in the database, the corresponding relationship comprises:
storing, in the database, the at least a portion of the data of the program and pointer information in which the at least a portion of the data of the program points to at least one data node of the plurality of data nodes.

6. The method according to claim 1, wherein the determining that the subgraph may be optimized through operation fusion comprises:
determining whether at least one operation node associated with the program is not included in the subgraph.

7. The method according to claim 1, wherein the determining that the subgraph may be optimized through operation fusion comprises:
determining that, for every data node of the plurality of data nodes in the subgraph, the subgraph comprises all operation nodes adjacent to the data node and all edges connecting the data node to any other node; and
determining that, for every path between at least two operation nodes of the plurality of operation nodes, the subgraph comprises all nodes and all edges in the path.

8. An information processing system, comprising:
memory; and one or more processors coupled to the memory and configured to execute one or more computer-readable programs stored in the memory, wherein the memory stores instructions that, when executed by the one or more processors, cause the information processing system to:

receive, as a query, a subgraph of an intermediate representation that is a subject of a determination of optimization applicability, wherein the intermediate representation is an intermediate representation of a program executable by one or more computing devices, wherein the program comprises data and a plurality of operations, and, wherein the intermediate representation comprises:

a plurality of data nodes;

a plurality of operation nodes; and a plurality of edges each representing an input/output relationship between at least one of the plurality of data nodes and at least one of the plurality of operation nodes;

determine that the subgraph may be optimized through operation fusion; and perform, based on the determining that the query may be optimized through operation fusion, optimization on the subgraph by fusing at least two of the plurality of operation nodes.

9. The information processing system according to claim 8, wherein the program comprises at least one of:

a program associated with tensors; or a deep learning program, and wherein the data comprises at least one of:

tensor type data, or data of the deep learning program.

10. The information processing system according to claim 8, wherein the instructions, when executed by the one or more processors, cause the information processing system to perform the optimization by causing the information processing system to:

generate a modified subgraph by removing, from the subgraph, one or more nodes.

11. The information processing system according to claim 8, wherein the instructions, when executed by the one or more processors, cause the information processing system to:

generate the intermediate representation from the program; and store, in a database, a corresponding relationship between at least a portion of the data of the program and the data nodes of the intermediate representation.

12. The information processing system according to claim 11, wherein the instructions, when executed by the one or more processors, cause the information processing system to store, in the database, the corresponding relationship by causing the information processing system to:

store, in the database, the at least a portion of the data of the program and pointer information in which the at least a portion of the data of the program points to at least one data node of the plurality of data nodes.

13. The information processing system according to claim 8, wherein the instructions, when executed by the one or more processors, cause the information processing system to determine that the subgraph may be optimized through operation fusion by causing the information processing system to:

determine whether at least one operation node associated with the program is not included in the subgraph.

14. The information processing system according to claim 8, wherein the instructions, when executed by the one or more processors, cause the information processing system to determine that the subgraph may be optimized through operation fusion by causing the information processing system to:

determine that, for every data node of the plurality of data nodes in the subgraph, the subgraph comprises all operation nodes adjacent to the data node and all edges connecting the data node to any other node; and determine that, for every path between at least two operation nodes of the plurality of operation nodes, the subgraph comprises all nodes and all edges in the path.

15. One or more non-transitory computer-readable media storing instructions that, when executed by one or more processors of an information processing system, cause the information processing system to:

receive, as a query, a subgraph of an intermediate representation that is a subject of a determination of optimization applicability, wherein the intermediate representation is an intermediate representation of a program executable by one or more computing devices, wherein the program comprises data and a plurality of operations, and, wherein the intermediate representation comprises:

a plurality of data nodes;

a plurality of operation nodes; and a plurality of edges each representing an input/output relationship between at least one of the plurality of data nodes and at least one of the plurality of operation nodes;

determine that the subgraph may be optimized through operation fusion; and perform, based on the determining that the query may be optimized through operation fusion, optimization on the subgraph by fusing at least two of the plurality of operation nodes.

16. The one or more non-transitory computer-readable media according to claim 15, wherein the program comprises at least one of:

a program associated with tensors; or a deep learning program, and wherein the data comprises at least one of:

tensor type data, or data of the deep learning program.

17. The one or more non-transitory computer-readable media according to claim 15, wherein the instructions, when executed by the one or more processors, cause the information processing system to perform the optimization by causing the information processing system to:

generate a modified subgraph by removing, from the subgraph, one or more nodes.

* * * * *